United States Patent

Trevor, 3rd

[15] 3,670,324

[45] June 13, 1972

[54] ANALOG-DIGITAL SHAFT POSITION ENCODER

[72] Inventor: John B. Trevor, 3rd, Feeks Lane, Locust Valley, N.Y. 11560

[22] Filed: March 27, 1970

[21] Appl. No.: 23,270

[52] U.S. Cl. .................................340/347 SY, 340/347 AD
[51] Int. Cl. ......................................................H03r 13/20
[58] Field of Search ..........................................340/347 AD

[56] References Cited

UNITED STATES PATENTS

| | | | |
|---|---|---|---|
| 3,541,546 | 11/1970 | French | 340/347 |
| 3,505,669 | 4/1970 | Welch | 340/347 |
| 3,363,244 | 1/1968 | Milroy | 340/347 |

*Primary Examiner*—Thomas A. Robinson
*Attorney*—Curtis, Morris & Safford

[57] ABSTRACT

Encoding equipment in which the output signals of a position encoder such as a shaft position encoder are sampled for counting only during a short sampling period in each cycle of the output signals. The sampling period is determined by a signal from a clock source, and the clock source is used to synchronize the operation of the entire counting system. Thus, the chances that spurious counts will be created by spurious signals is minimized. The shaft encoder preferably produces two trains of output pulses in quadrature. The output pulses are counted by an up-down counting system which displays a digital number representing the shaft position together with a plus or minus sign to indicate the direction in which the shaft has been rotated.

10 Claims, 4 Drawing Figures

PATENTED JUN 13 1972

3,670,324

SHEET 1 OF 2

INVENTOR
JOHN B. TREVOR III
BY
Curtis, Morris & Safford
ATTORNEYS

PATENTED JUN 13 1972

3,670,324

SHEET 2 OF 2

INVENTOR
JOHN B. TREVOR III
BY
Curtis, Morris & Safford
ATTORNEYS

ANALOG-DIGITAL SHAFT POSITION ENCODER

This invention relates to encoders, and particularly to devices for digitally representing distances moved by mechanical structures. More particularly, this invention relates to shaft position encoding systems, and to electrical counters used in such systems.

In certain prior motion encoding systems, such as shaft position encoders, a counter is used to count pulses whose number represents the relative position of the shaft. Such prior systems often are relatively inaccurate and unreliable because spurious counts are caused by electrical noise, interference and other phenomena.

Accordingly, it is an object of the present invention to provide accurate and reliable electrical counting and encoding equipment for digitally encoding the positions of movable elements such as rotatable shafts.

It is another object of this invention to provide such equipment which is relatively simple and inexpensive to make and maintain and which is relatively easy to use with digital computers.

These and other objects are met in accordance with the present invention by providing encoding equipment in which the output signals of a position encoder such as a shaft position encoder are sampled for counting only during a short sampling period in each cycle of the output signals. The sampling period is determined by a signal from a clock source, and the clock source is used to synchronize the operation of the entire counting system. Thus, the chances that spurious counts will be created by spurious signals is minimized.

The foregoing and other objects and advantages of the invention will be set forth in or apparent from the following description and drawings, in which.

Figure 1:
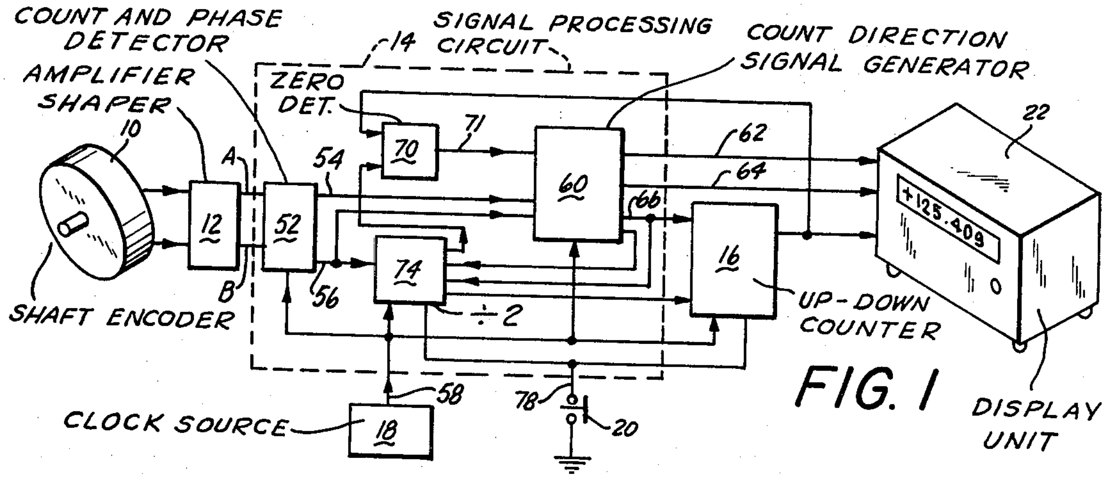
FIG. 1 is a schematic diagram of one embodiment of the present invention.

FIG. 1 is a block diagram of an encoding system constructed according to the present invention. The system includes a shaft encoder 10 which is connected to an amplifier-shaper circuit 12. The shaft encoder 10 produces pulses in the form of a pair of quasi-sinusoidal signals in quadrature (i.e., 90° out of phase with one another). Determination of which of the two signals leads the other signal determines the direction in which the shaft is rotating. Shaft encoders of this type are well known. A typical encoder is sold under the designation "DRC-77 Shaft Angle Digitizer" by the Dynamic Research Corp., Stoneham, Massachusetts. Such an encoder produces up to 4,096 counting pulses per revolution of its shaft.

Figure 2:
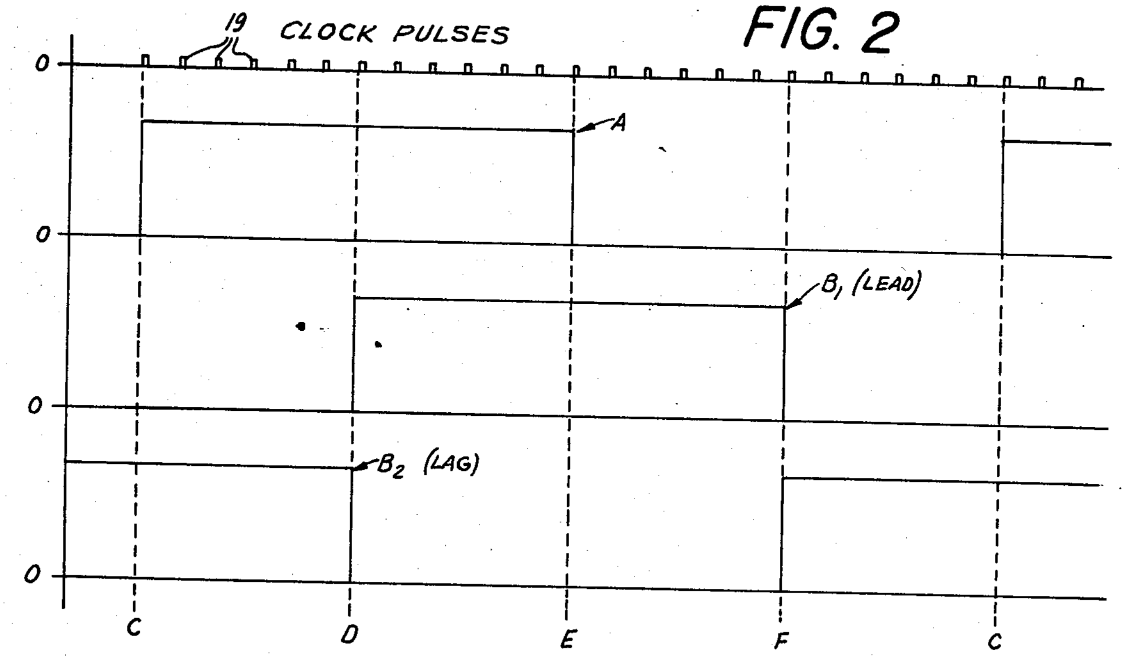
FIGS. 2 and 3 show the wave forms of typical signals of a portion of the circuit shown in FIG. 1.

Amplifier shaper circuit 12, which is a conventional level detector, such as a Schmitt trigger circuit, for example, converts the output signals of shaft encoder 10 into a pair of square waves in quadrature. These signals are designated "A" and "B," and their waveforms are shown in FIG. 2. Signal A is a square wave alternating between the logical level 0 and the logical level 1 while signal B may be either signal $B_1$ or $B_2$, depending upon the direction of rotation of the encoder shaft. As is apparent from FIG. 2, signals $B_1$ and $B_2$ are 90° out of phase with signal A, with signal $B_1$ leading signal A by 90° and signal $B_2$ lagging signal A by 90°. In a single cycle, there will be four transitions in logical levels. These four transitions, indicated by the letters C, D, E and F, are employed to generate counting pulses and a count direction signal in a manner to be described hereinafter.

Referring again to FIG. 1, output signals A and B of the amplifier-shaper 12 are delivered to a signal processing circuit 14. The processing circuit 14 delivers output signals to a bidirectional ("up-down") counter 16 which delivers its count signals to a display unit 22. The display unit 22 displays the count in decimal form. Additionally, further signals are delivered to the unit 22 to cause it to display a plus or minus sign to indicate the direction of rotation of the shaft of the encoder 10.

In accordance with the present invention, the signal processing circuit and the counter 16 are enabled periodically by clock pulses 19 (see FIG. 2) delivered from a conventional clock source 18 (see FIG. 1) over a lead 58. The frequency of the clock source 18 is substantially greater than the frequency of the logical transitions of the input signals. For example, the clock frequency should be at least 1.2 times, and preferably more than 2 times the maximum anticipated frequency of the transitions. Under normal operating conditions, the transition frequency will be much lower than its maximum value, and thus will be much less than one half of the clock frequency. In the examples of typical waveforms shown in FIG. 2, the frequency of the clock pulses 19 is around 6 times the frequency of the transitions B, C, D and E.

Figure 3:
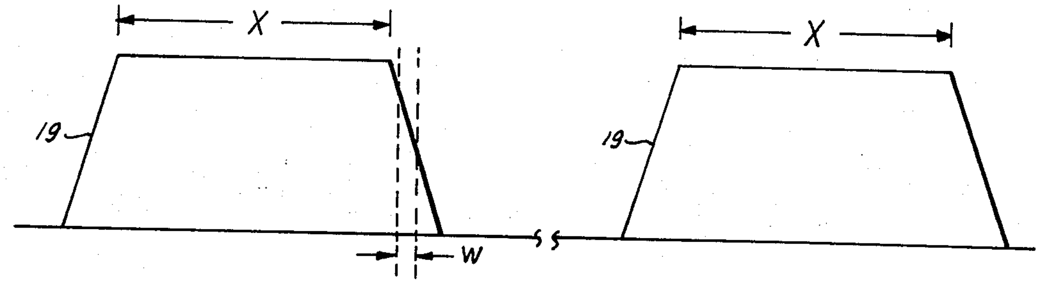

Preferably, the clock pulses 19 have a short time duration relative to the duration of one clock cycle. FIG. 3 is an enlarged view of two clock pulses 19, each having a width or time duration X which is around 20 percent of the time duration of one clock cycle. Furthermore, as will be explained in greater detail below, the circuit 14 and counter 16 will be enabled only during a very short portion W of each pulse 19.

The use of the foregoing features minimizes the chance that any spurious input signals can cause spurious counts and errors in the encoding system. This is true not only because the time during which such spurious signals can enter the system is minimized, but also, as will be explained in greater detail below, because the potentially adverse effects of many spurious signals which might enter the system will be cancelled.

Referring again to FIG. 1, the operation of the synchronous signal processing network 14 now will be explained. The A and B signals from amplifier-shaper 12 are conducted to a count and phase detection circuit 52. Count and phase detection circuit 52 produces output signals on two leads 54 and 56. The signal on lead 54, termed the "phase signal," is indicative of the phase relationship between signals A and B. Specifically, the phase signal will be a 1 when signal B lags signal A and 0 when signal B leads signal A. The signal on lead 56 is termed a "count enable" signal, which enables the counter 16 upon each transition C, D, E or F.

Clock pulses from the clock input lead 58 are connected to the count and phase detection circuit 52, so as to periodically enable it, in a manner to be described hereinafter.

The phase signal and the count enable signal are connected to a "count direction" signal generator circuit 60, whose function it is to generate a signal at output terminal 66 indicative of whether decade counter 16 is to be incremented or decremented. In addition, count direction signal generator circuit 60 produces a pair of signals at output terminals 62 and 64 indicative of the sign to be displayed by the display 22. Furthermore, a 0 signal, indicative of the fact that the decade counter 16 contains zeros in all of its decimal places, is conducted to the count direction signal generator circuit 60 over a lead 71 from a zero detector circuit 70. Zero detector circuit 70 functions to produce a 0 signal on lead 71 if all the decimal places of decade counter 16 contains zeros.

Optionally, the count enable signal produced by the count and phase detection circuit 52 is connected to a divide-by-two circuit 74. The divide-by-two circuit 74 is employed in order to increase the resolution of the encoding system.

A reset switch 20 is provided to reset the B.C.D. counter 16 and the remainder of the system to zero.

Figure 4:
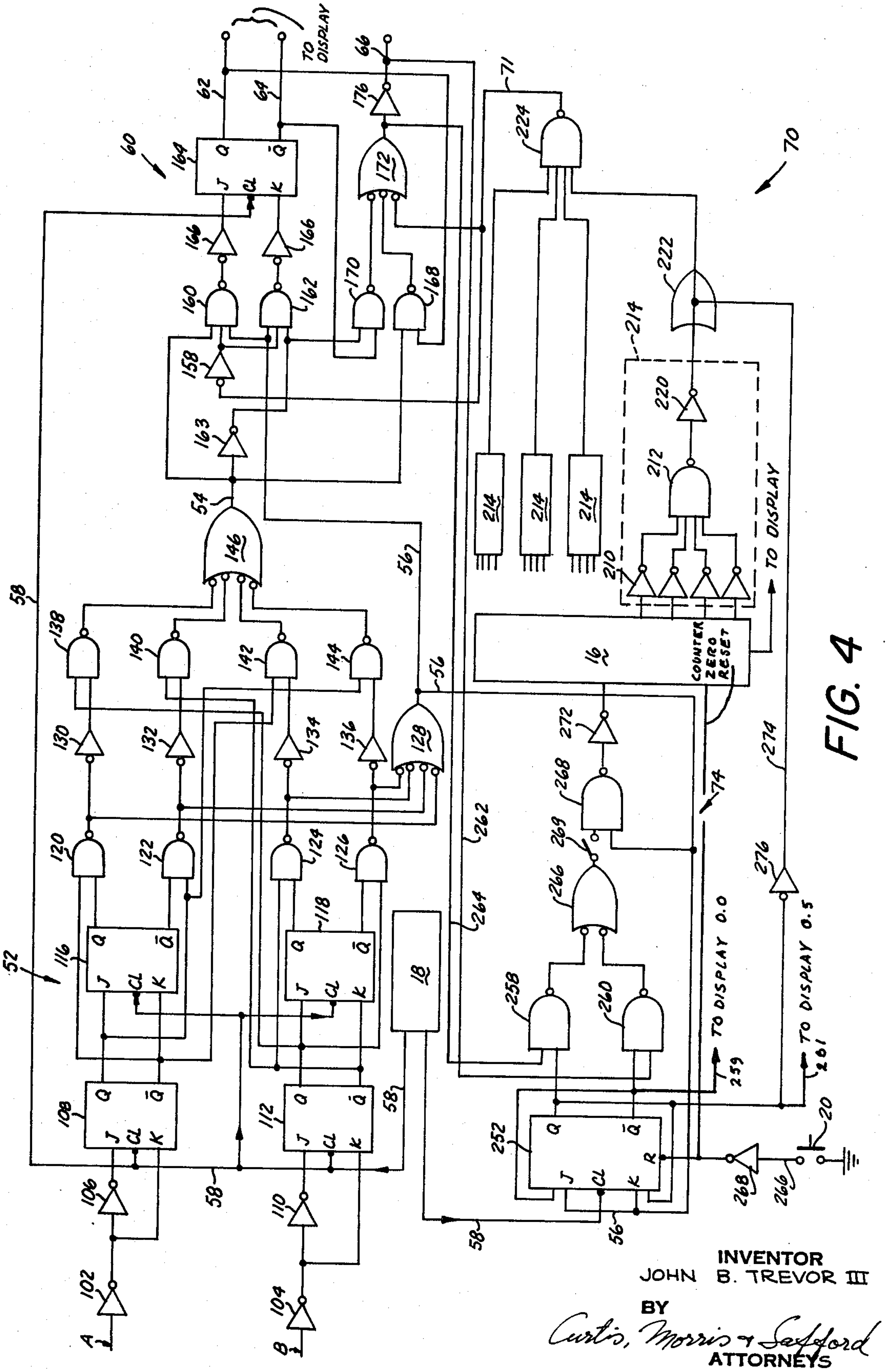
FIG. 4 is a detailed schematic circuit diagram of a portion of the device shown in FIG. 1.

Referring to FIG. 4, the count and phase detection circuit, shown generally at 52, will now be explained. The A and B output signals of amplifier-shaper circuit 12 are conducted to the input terminals of inverting amplifiers 102 and 104, respectively. The output of inverting amplifier 102 is connected to the input of another inverting amplifier 106 and the K input of a J-K flip-flop circuit 108. Similarly, the output of inverting amplifier 104 is connected to the input of an inverting amplifier 110 and the K input of a J-K flip-flop 112. The outputs of inverting amplifiers 106 and 110 are connected to the J inputs of flip-flops 108 and 112, respectively. The clock ("CL") input terminals of flip-flops 108 and 112 are connected to the clock line 58.

Inverting amplifiers 102, 104, 106 and 110 conduct signals A and B to the flip-flops 108 and 112 so as to actuate those flip-flops at the end of each clock pulse. Thus, while the flip-flops are enabled, if signal A is a 1 while signal B is a 0, a 1 will appear at the Q output of flip-flop 108, a 0 will appear at the $\bar{Q}$ output of flip-flop 108, a 0 will appear at the Q output of flip-flop 112 and a 1 will appear at the $\bar{Q}$ output of flip-flop 112 at the end of the clock pulse. These outputs will remain in this state until the end of the next clock pulse, at which time any change in input signals A or B will switch the flip-flop 108 or 112, in accordance with the new input information.

The flip-flops 108 and 112 and all other flip-flops used in the encoding system preferably are of the "master-slave" integrated circuit type, such as the "845" or "945" integrated circuits sold by Fairchild Instrument Corp. and others. Such flip-flops will receive input signals only during a short time "-window" W (see FIG. 3) in the trailing edge of each clock pulse 19. Such windows typically are from 1 to 30 nanoseconds in duration, a time which is substantially less than the duration of each clock cycle, and, of course, is substantially less than the period between data transitions. Thus, the time during which spurious input signals can be entered into the system is minimized.

The Q and $\bar{Q}$ inputs of flip-flop 108 are respectively connected to the J and K inputs of a J-K flip-flop 116. Similarly, the Q and $\bar{Q}$ outputs of flip-flop 112 are respectively connected to the J and K inputs of a J-K flip-flop 118. The clock inputs of flip-flops 116 and 118 are also connected to clock line 58. By so interconnecting flip-flops 108 and 116 and 112 and 118, respectively, flip-flop 116 will assume the previous state of flip-flop 108 and flip-flop 118 will assume the previous state of flip-flop 112, at the end of each clock pulse. Thus, the latest values of signals A and B are stored in flip-flops 108 and 112, respectively, and the previous values thereof are stored in flip-flops 116 and 118, respectively. If signals A and B have not changed between clock pulses, flip-flops 108 and 116 will be in the same state and flip-flops 112 and 118 will be in the same state. Any change in the states of signals A and B may thus be determined by comparing the states of the flip-flop containing the latest value thereof with the flip-flop containing the previous value thereof.

This comparison is accomplished by four NAND gates 120,122, 124 and 126. The inputs of NAND gate 120 are connected to the $\bar{Q}$ output of flip-flop 108 and the $\bar{Q}$ output of flip-flop 116, so that a 0 will appear at the output of NAND gate 120 if signal A has changed from 1 to 0. The inputs of NAND gate 122 are connected to the Q output of flip-flop 108 and the $\bar{Q}$ output of flip-flop 116, so that a 0 will appear at the output of NAND gate 122 when signal A has changed from 0 to 1.

The inputs of NAND gate 124 are connected to the $\bar{Q}$ output of flip-flop 112 and the $\bar{Q}$ output of flip-flop 118, so that 0 will appear at the output of NAND gate 124 when signal B has changed from 1 to 0.

Finally, the inputs of NAND gate 126 are connected to the Q output of flip-flop 112 and the Q output of flip-flop 118 so that a 0 will appear at the output of NAND gate 126 when signal B has changed from a 0 to a 1.

Any change in signals A or B will thus be represented by a 0 at the output of one of the NAND gates 120,122, 124 or 126, at the end of the clock pulse most closely following the change in signal A or B. The output of NAND gates 120, 122, 124 and 126 are connected to the inputs of an inverting OR gate 128, so that a 1 will appear at the output of inverting OR gate 128 when a 0 appears at any of the outputs of NAND gates 120, 122, 124 and 126. The output signal of inverting OR gate 128 is the count enable signal previously referred to.

The output of NAND gates 120, 122, 124 and 126 are also respectively connected through inverting amplifiers 130, 132, 134 and 136 to the inputs of NAND gates 138, 140, 142 and 144. An input of NAND gate 138 is also connected to the $\bar{Q}$ output of flip-flop 112, so that a 0 will appear at the output of NAND gate 138 when signal A has changed from a 1 to a 0 and signal B is a 1. Similarly, an input of NAND gate 140 is connected to the $\bar{Q}$ output of flip-flop 112, so that a 0 will appear at the output of NAND gate 140 when signal A has changed from a 0 to a 1 and signal B is a 0.

An input of NAND gate 142 is connected to the $\bar{Q}$ output of flip-flop 108, so that a 0 will appear at the output of NAND gate 142 when signal B has changed from a 1 to a 0 and signal A is a 0. Similarly, an input of NAND gate 144 is connected to the Q output of flip-flop 108, so that a 0 will appear at the output of NAND gate 144 when signal B has changed from a 0 to 1 and signal A is a 1.

In this manner, the signal A or B which has not changed is examined to determine its state, so as to determine whether signal B leads or lags signal A. Referring to FIG. 2, it can be seen that NAND gate 138 detects the E transition between signal A and signal $B_2$. Similarly, NAND gates 140, 142 and 144 detect transitions C, F and D, with respect to signals A and $B_2$, respectively. Thus, a 0 will appear at the output of NAND gate 138, 140, 142 or 144 if a change has occurred in either signal A or B, and signal B lags signal A. If signal B leads signal A, corresponding to signals A and $B_1$ of FIG. 2, no 0 will appear at the outputs of NAND gates 138, 140, 142 and 144.

The output of NAND gates 138, 140, 142 and 144 are connected to the inputs of an inverting OR gate 146, so that a 1 will appear at the output thereof if the output of any of NAND gates 138, 140, 142 or 144 is a 0. Thus, a 1 at the output of inverting OR gate 146 indicates that signal B lags signal A. Conversely, a 0 at the output of inverting OR gate 146 indicates that signal B leads signal A. The output signal on the output lead 54 from inverting OR gate 146 is the phase signal referred to hereinbefore.

As it was mentioned above, of the very few spurious signals which slip into the encoding system through the narrow window W, the effect of most is cancelled by the use of the present invention. For example, if a spurious actuation of the system is caused by a noise signal occurring during one of the windows, and if there is no data transition in the meantime, the effect of the transient most likely will be cancelled by the next clock pulse. Thus, by making the clock frequency substantially higher than the transition frequency, a high rate of cancellation of this type is obtained.

The count direction signal generator circuit 60 generates a signal indicative of whether decade counter 16 is to be incremented or decremented, in response to the phase signal from the count and phase detector circuit 52 and the zero signal from the zero detector circuit 70. The zero signal,which is a 0 if all of the places of decade counter 16 are zeros, is conducted to terminal 71.

The output signal from the zero detector circuit 70 is conducted to the input of an inverting amplifier 158, whose output is connected to inputs of a pair of NAND gates 160 and 162. The phase signal is conducted over the lead 54 to one input of NAND gate 160 and the input of an inverting amplifier 163, whose output is connected to an input of NAND gate 162. The count enable signal is conducted over the lead 56 to the input leads of NAND gates 160 and 162. If the zero signal is a 1, 1's will appear at the outputs of NAND gates 160 and 162 regardless of the state of the other input signals to those gates. However, if the zero signal is a 0, a 0 will appear at the output of NAND gate 160 and a 1 will appear at the output of NAND gate 162 if the phase signal is a 1 1, indicating that signal B lags signal A. If the zero signal is a 0, and the phase signal is a 0, indicating that signal B leads signal A, a 1 will appear at the output of NAND gate 160 and a 0 will appear at the output of NAND gate 162. The outputs of NAND gates 160 and 162 are respectively connected to the J and K inputs of a J-K flip-flop 164 through a pair of inverting amplifiers 166.

The Q and $\bar{Q}$ outputs of flip-flop 164 are the respective plus and minus signal outputs of the count direction signal generator 60 which are delivered to the display device 22 to indicate the direction of shaft rotation. NAND gates 160 and 162 cooperate with flip-flop 164 so that when the zero signal equals 0, the Q output of flip-flop 164 will be a 1 if signal B lags signal A, and a 0 if signal B leads signal A. Of course, the $\overline{Q}$ output of flip-flop 164 will be in the opposite state of the Q output. If the zero signal is a 1, the Q and $\overline{Q}$ outputs of flip-flop 164 will remain unchanged. In this manner, the appropriate plus and minus sign signals will be provided to the display 22, and these sign signals will change when the counter crosses the count of zero.

The Q and $\overline{Q}$ outputs of flip-flop 164 are respectively connected to inputs of NAND gates 168 and 170. An input terminal of flip-flop 168 is connected to terminal 54 and an input of gate 170 is connected to the output of inverting amplifier 164. The output of NAND gate 168 will be a 0 when the Q output of flip-flop 164 is a 1 and signal B leads signal A. The output of gate 170 will be a 0 when the $\overline{Q}$ output of flip-flop 164 is a 0 and signal B lags signal A.

The output of NAND gates 168, 170 and the zero signal are connected to the three input leads of an inverting OR gate 172, so that a 0 will appear at the output of inverting OR gate 172 when the zero signal or the output signal of either NAND gate 168 or 170 is a 0. The output of inverting OR gate 172 is conducted to the output terminal 66 through an inverting amplifier 176. The signal at output terminal 66 is the increment/decrement signal referred to hereinbefore, which will be a 0 when binary counter 16 is to increment and a 1 when binary counter 16 is to decrement.

Gates 168, 170 and 172 cooperate to generate the increment/decrement signal hereinbefore referred to, in a manner to insure that the binary counter 16 will be incremented at zero, with appropriate change of signs, and will thereafter be incremented or decremented depending upon the phase relationship between signal A and signal B. Of course, the choice of this phase relationship is arbitrary, and is made to conform to the requirements of the particular decade counter 16 employed, and the desired signal which is to accompany a particular direction of rotation.

The decade counter 16 is a conventional BCD counter, such as the "9306" MSI up/down BCD counter sold by Fairchild Instrument Corp., or a "MEM 1056" MOS-MSI up-down BCD counter, with count, storage, decoding and display driving capabilities, made and sold by General Instrument Corp.

In the zero detector circuit 70, the binary coded decimal output of the "units" place of decade counter 16 is conducted to a circuit 14 which includes inverting amplifiers 210, to a NAND gate 212, and an inverting amplifier 220. Similarly, the output of each of the tens, hundreds, and thousands places of decade counter 16 is conducted to the input terminals of an identical circuit 214. The output of each circuit 214 is conducted to one of the four input leads of a four-input NAND gate 224. The output of the first of the circuits 214 passes through a wired OR circuit 222, which also is connected to the Q terminal of flip-flop 257 by a lead 274 through an inverting amplifier 276.

The output signal from the gate 224 is conducted over lead 71 to the inverting amplifier 158 and the gate 172. The signal on lead 71 normally is a 1, thus signifying that the counter 16 has a count other than zero. However, when the counter 16 has a zero count, then an input signal is developed on each input lead of the gate 224, with the result that the signal on lead 71 changes to a 0, thus signalling the circuit 60 that the count on the counter 16 is zero and enabling the display to operate in the proper direction.

The gate 224 is prevented from changing to the 0 output state by the presence of a signal on lead Q of flip-flop 252 of the divide-by-two circuit 74. Thus, the zero signal will not be delivered to the circuit 60 unless the divide-by-two circuit 74 is in its original state; that is, unless the divide-by-two circuit also registers a 0 output signal.

The operation of the divide-by-two circuit 74 will now be explained. The J and K inputs of a J-K flip-flop 252 are connected to receive the count enable signal over lead 56 from the count and phase detection circuit 52. The clock input terminal "CL" of flip-flop 252 is connected to the clock signal generator 18 so that flip-flop 252 will change its state upon receipt of the trailing edge of the clock pulse, if the count-enable signal is a 1. The Q and $\overline{Q}$ output leads of flip-flop 252 are respectively connected to one input lead of a pair of NAND gates 258 and 260. The other input lead of NAND gate 258 is connected to a line 262 which is connected to the output of gate 172 and thus receives the inverted increment/decrement signal from the count direction signal generator circuit 60. The other input terminal of NAND gate 260 receives the increment/decrement signal from the terminal 66 over a line 264.

The output of NAND gate 258 will be a 0 when the Q output of flip-flop 252 is a 1 and the increment/decrement signal is a 0, indicating that the counter is to be incremented. The output of NAND gate 260 will be a 0 when the $\overline{Q}$ output of flip-flop 252 is a 1 and the increment/decrement signal is a 1 indicating that the counter is to be decremented.

The reset terminal of the flip-flop 252 and the Counter Zero Reset lead are connected to the reset switch 20 through an inverting amplifier 268 and a line 266. When reset switch 20 is momentarily depressed, flip-flop 252 is reset into the state in which the Q output is a 0 and the $\overline{Q}$ output is a 1, and the counter 16 is reset to zero.

The outputs of NAND gates 258 and 260 are connected to the input of an inverting OR gate 268. The output of inverting OR gate 266 is conducted to one input of a NAND gate 268 through a switch 269, the other input of gate 268 is connected to receive the count-enable signal present on terminal 56. The output of NAND gate 268 is conducted through inverting amplifier 272 to the counter 16.

Flip-Flop 252 and gates 258, 260, 262 and 268 cooperate so that a 1 signal will be delivered to the counter for every other count-enable signal. The display unit 22 includes, for example, a series of "NIXIE" tubes for displaying the count of the counter 16 and the sign of the count. The output signals from the flip-flop 252 are conducted to the NIXIE tube representing the least significant digit of the display over the lines 259 and 261 with a connection such that a signal on line 259 will make that tube read 0, and a signal on line 261 will make that tube read 5. Thus, typical successive numbers displayed would be 72.0, 71.5, 71.0, 70.5, 70, etc. This type of a display is convenient for use by engineers, craftsmen, etc.

The further resolution obtained by use of the divide-by-two circuit 74 is optional; the circuit can be disabled simply by opening the switch 269 and providing a steady bias to the upper input terminal of gate 268.

The above description of the invention is intended to be illustrative and not limiting. Various changes or modifications in the embodiments described may occur to those skilled in the art and these can be made without departing from the spirit or scope of the invention.

I claim:

1. A shaft position encoder including transducer means for producing two trains of data pulses in quadrature with respect to one another, with one of said trains leading the other during shaft rotation in one direction, and lagging the other during shaft rotation in the other direction, the number of pulses in each train representing the relative shaft position in a particular direction, means for up-down counting of said data pulses to digitally indicate the shaft position, a clock source for enabling said counting means, said clock source having a frequency substantially greater than that at which said data pulses are developed, means for enabling said counting means for only a relatively small portion of each clock pulse cycle, means for incrementing or decrementing said counting means in accordance with the leading-lagging relationship between said trains, and for indicating the leading or lagging relationship and thus indicating the direction of rotation of the shaft.

2. An encoder as in claim 1 including means for visually displaying the count on said counting means and visually indicating the direction of rotation of said shaft.

3. An encoder as in claim 1 including divide-by-two circuit means for dividing in half the frequency of said data pulses prior to their being counted.

4. An encoder as in claim 1 in which said clock source frequency is at least twice the maximum frequency of said data pulses.

5. An analog-to-digital shaft position encoder including means for converting the relative shaft position into data pulses whose total represents said position, a bi-directional counter for counting said data pulses and indicating said total, means for indicating the direction of change of said shaft position and, for each such data pulse incrementing or decrementing said counter in accordance with said direction of change, and means for causing the indication of the direction of change to reverse upon a transition of the signal from said direction change indicating means.

6. An encoder as in claim 5 including a clock source for enabling the delivery of said pulses to said counter at a rate substantially higher than the rate at which said pulses are developed.

7. An encoder as in claim 6 including means controlled by said clock source for enabling said delivery for only a small fraction of a cycle of the clock signal.

8. An encoder as in claim 5 including means for storing one logic state of said converting means, means for comparing the succeeding logic state of said converting means with said one logic state and incrementing or decrementing said counter in response to the detection of a change in said logic state.

9. An encoder as in claim 8 in which said encoder includes a transducer which produces two quadrature pulse trains which lead or lag one another in accordance with the direction of change of said position of said shaft.

10. An encoder as in claim 5 including means for detecting and indicating when said shaft is in its zero reference position.

* * * * *